United States Patent [19]
Hartitz et al.

[11] 4,128,379
[45] Dec. 5, 1978

[54] APPARATUS FOR PROCESSING EXTRUDED THERMOPLASTIC POLYMER

[75] Inventors: Joachim E. Hartitz, Avon Lake; Sam D. Nehemy, Lorain; Erwin R. Wahl, Avon Lake, all of Ohio

[73] Assignee: The B. F. Goodrich Company, Akron, Ohio

[21] Appl. No.: 809,230

[22] Filed: Jun. 23, 1977

[51] Int. Cl.² .............................................. B29C 25/00
[52] U.S. Cl. .................................... 425/446; 425/404; 425/378 R; 432/59; 432/77
[58] Field of Search ............... 425/378 R, 174.4, 404, 425/445, 446, 84, 377; 264/25; 432/59, 77, 8

[56] References Cited

U.S. PATENT DOCUMENTS

| | | | |
|---|---|---|---|
| 1,999,751 | 4/1935 | Clogton | 425/445 |
| 2,682,696 | 7/1954 | Milliken | 425/446 X |
| 3,048,383 | 8/1962 | Champlin | 432/77 X |
| 3,096,970 | 7/1963 | Caroselli | 432/8 X |
| 3,239,881 | 3/1966 | Larsen | 425/384 X |
| 3,288,317 | 11/1966 | Wiley | 425/404 X |
| 3,560,298 | 2/1971 | McArthur et al. | 425/384 X |
| 3,588,954 | 6/1971 | Nakamura et al. | 425/174.4 |
| 3,635,621 | 1/1972 | Miyauchi et al. | 425/174.4 X |
| 3,668,288 | 6/1972 | Takahashi | 264/89 X |
| 3,982,873 | 9/1976 | Graeber et al. | 425/404 |
| 4,035,129 | 7/1977 | Karppo et al. | 425/174.4 |

Primary Examiner—Robert L. Spicer, Jr.
Attorney, Agent, or Firm—Joseph Januszkiewicz

[57] ABSTRACT

Apparatus for processing extruded thermoplastic material by advancing a hollow extrudate from the die member of an extruder through auxiliary equipment followed by stress relieving the extrudate through a mesh guide means, wherein the initial portion is heated while the subsequent portion is cooled by passing it through the mesh guide which may be contained in a temperature controlled water bath.

9 Claims, 5 Drawing Figures

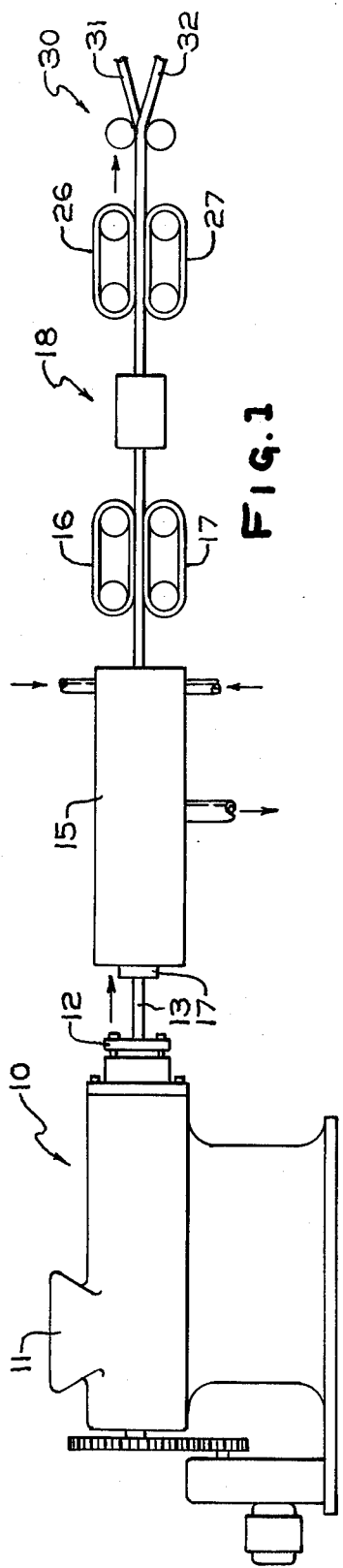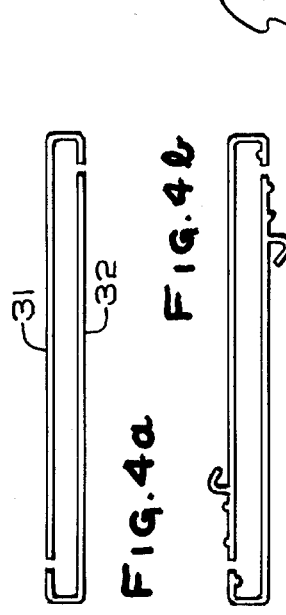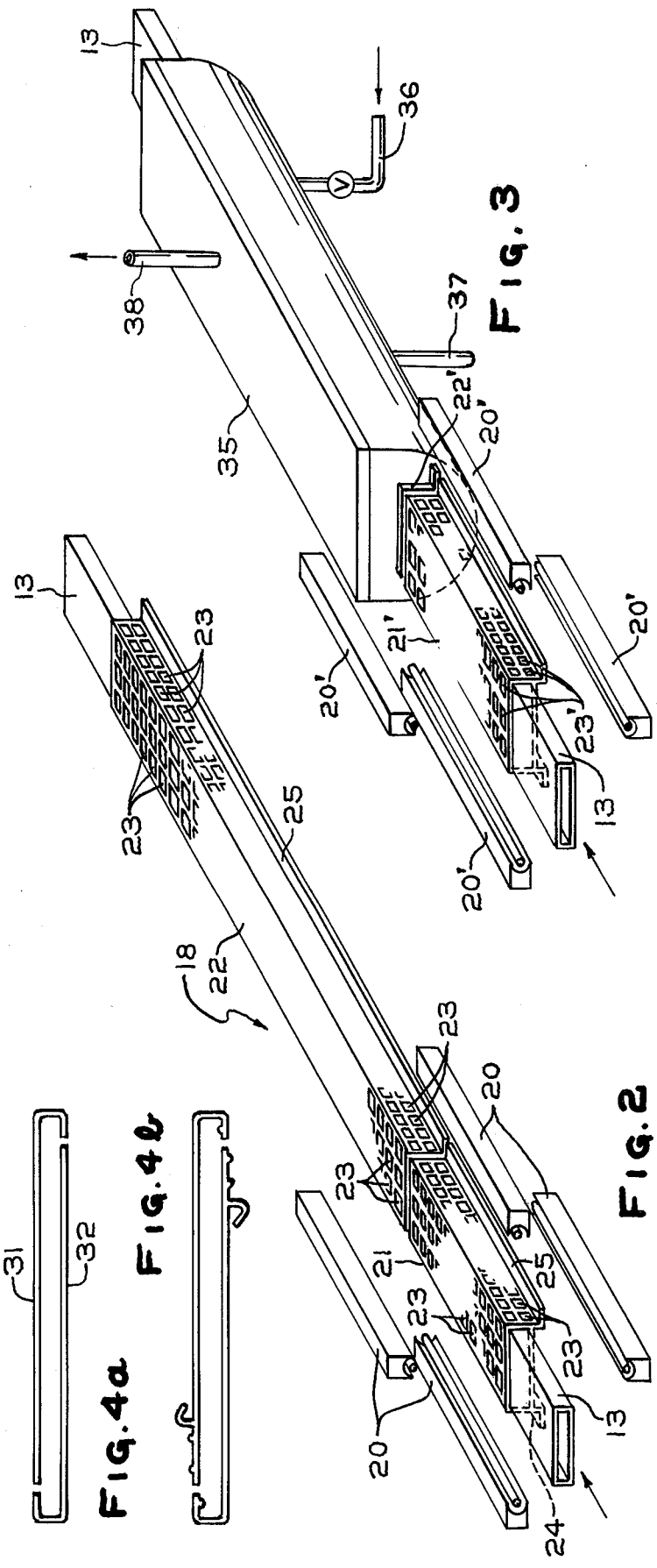

APPARATUS FOR PROCESSING EXTRUDED THERMOPLASTIC POLYMER

BACKGROUND OF THE INVENTION

This invention relates to extruding and more particularly to a new and improved apparatus for annealing extruded thermoplastic materials on an in-line production facility.

The extrusion of low stress or stress-free hollow profiles is necessarily done at low linear rates and low stock temperatures in order to minimize differences in the cooling rate between the internal and the external wall surfaces, otherwise stresses are introduced into the materials. In order to develop optimum properties in certain thermoplastic materials, it is desirable to extrudate at high extrusion rates and at high stock temperatures, however, the more severe cooling conditions needed inevitably lead to the formation of circumferential stresses during the sizing and cooling process. When such hollow profiles are cut longitudinally to provide separate longitudinal sections, the built-in stress will cause a deformation of shape in the profile. In a similar manner, when the initial profiles are subjected to temperatures close to their heat distortion temperatures, the stresses are relaxed, resulting in a deformation of the shape of the profile.

The present invention provides the means and the ability to significantly increase the extrusion rate at high temperatures by providing a new and improved means for annealing the shaped profile. The present invention is particularly useful on hollow extruded materials wherein the end product requires that the profile be cut longitudinally as heretofore any residual stresses that were built in become quite apparent upon cutting the product longitudinally. Such apparatus is useful in the processing of thermoplastic house siding in the form of a hollow rectangular shaped profile permitting easier handling, sizing and processing. This permits the extrudate to be processed at higher temperatures and higher speeds to provide better mechanical properties and excellent weathering characteristics. With proper annealing, the siding can be produced faster and more economically since the hollow shaped rectangular profile can be cut longitudinally to double production while producing stress-free siding. Such annealing means is adaptable to other shapes as well.

SUMMARY OF THE INVENTION

The present invention contemplates an apparatus for annealing a hollow shaped extrudate downstream from the extruder and die member so that the extrudate can be stress relieved by selective controlled heating while guiding the extrudate. Thereafter, the extrudate in its hollow shaped form is guided until sufficiently cooled so it can be cut into two seperate narrow width pieces or strips with stresses removed therefrom.

BRIEF DESCRIPTION OF THE DRAWINGS

FIG. 1 is a side elevational view, partly schematic, of the preferred embodiment showing the continuous line apparatus for processing a hollow shaped profile.

FIG. 2 is a fragmentary isometric view of the annealing apparatus with supporting structure removed to better illustrate the invention.

FIG. 3 is a fragmentary isometric view of a modification of the annealing apparatus disclosed with the rear portion thereof enclosed in a cooling tank.

FIG. 4a is an end view of a rectangular shaped product handled by the annealing apparatus disclosing the product severed into two portions.

FIG. 4b is an end view of a rectangular shaped product handled by the annealing apparatus disclosing the product severed into two house siding panels.

DETAILED DESCRIPTION

Referring to the drawings wherein like reference characters designate like or corresponding parts throughout the several views, there is shown in FIG. 1 an extruder 10 having a hopper 11 and a die means 12 at the forward portion thereof showing an extrudate 13 issuing therefrom. The die member 12 has a die opening that is contoured to a rectangular hollow shape, which in effect is that of two house siding sheets placed side edge to side edge similar to the configuration shown in FIG. 4a. The extrudate may have projections similar to that shown in FIG. 4b or groove therein to conform to the desired shape of the finished project since the example shown in only illustrative.

The hollow extrudate from the extruder 10 is fed into a cooling and sizing unit which is illustrated only generally as 15 located directly in line with the extruder 10. The forward end portion of cooling and sizing unit 15 has a rectangular shaped opening in the form of two house sidings, illustrated only generally in FIG. 4a, at its forward end 17. As the article is moved through the cooling and sizing unit 15, a suitable sizing member forms the final shape of the article prior to its being cooled as it passes through the remaining portion of sizing member 15.

A vacuum is drawn on the exterior of hollow article to maintain the siding surfaces in full contact with a contoured sizer to properly size the extrudate. Suitable conduit means are provided to direct coolant into the cooling and sizing unit 15 to cool the extrudate passing therethrough. These units are old and well known in the art and accordingly are only illustrated generally as 15. Reference is made to U.S. Pat. Nos. 3,804,574 and 3,169,272 incorporated herein by reference.

The hollow extrudate is then directed by a take-away conveyor means 16-17 to a stress reliever means 18 consisting of infrared heaters 20 and guide housings 21 and 22. Stress reliever means 18 is shown as having four infrared heaters 20 spaced 90° around the longitudinal pass line of guide housings 21 and 22. The heater 20 directs the heat onto the extrudate 13 as its passes through housing 21. Suitable means such as bracket are used to maintain the spacing of the heaters 20, however, for clarity, such brackets are eliminated. Guide housings 21 and 22 are shaped in cross section according to the cross section of the profile desired, each having a plurality of openings, or perforations 23 spaced throughout the lengths thereof. In the example shown, the housing has four generally parallel panels or walls. The respective upper, lower and side panels have openings 23, which openings 23, although shown as regular perforations, may vary in design and configuration to provide an openwork barrier or screen to diffuse the heat while offering direct support for the hollow extrudate as it is fed through the guide housings. The housings 21 and 22 are shown as two separate units, however, the housings may be joined to form one continuous unit. The lower panels of housing 21 and 22 have laterally extending flanges 24-25 to facilitate the mounting of the guide housings 21 and 22 on suitable support means.

As the extrudate enters the first guide housing 21, the infrared heaters 20 heat the extrudate to a temperature slightly above the glass transition point of the material. As the extrudate passes into the second guide housing 22, the extrudate is allowed to cool down 20 to 30 degrees of Fahrenheit units below the glass transition point. The respective lengths of the two housings 21 and 22 are dependent upon the wall thickness and the linear extrusion speed of the extrudate. As an example, an infrared exposure time of 10 seconds was adequate for a wall thickness between 50 and 60 mils at a linear speed of 4 feet/min.

The hollow extrudate is then pulled by a set of takeaway conveyors 26 and 27 from the stress reliever means 18 and directed into the path of a pair of circular cutting means 30 which separates the hollow extrudate into a pair of separate flat panels which may be house siding panels 31 and 32 (illustrated generally in FIG. 1). The continuous lengths of siding may be embossed and cut to length in a manner old and well known in the art.

In the operation of the apparatus described, the extruder 10 extrudes over a suitable mandrel and through a suitably shaped die, an extrudate that is a hollow rectangular shaped member 13 in the form of two house siding members joined together (note FIG. 4a). As the hollow shaped member 13 issues from the extruder, it is cooled and sized in tank 15 while pulling a vacuum on the outer surface of the extrudate. The extrudate is cooled within tank 15 as by spraying the extrudate with a cooling fluid as it is moved therethrough. U.S. Pat. Nos. 3,804,574 and 3,169,272 show sizing and cooling within a tank downstream from the extruder. The extrudate is then fed into the stress relieving means 18 which has guide housings 21 and 22.

As the hollow extrudate passes through the open-mesh constructed guide housing 21, infrared heaters 20 direct heat onto the extrudate as it is supported and guided. The extrudate then passes into guide housing 21, which supports the extrudate until it is sufficiently cooled to handle. Takeaway conveyors 26–27 feed the cooled stress-relieved product to the circular cutting means where the longitudinally extending hollow profile is cut into two separate flat panels 31 and 32 (FIG. 4).

A modification of the heat treatment apparatus is shown in FIG. 3, wherein a first guide housing 21' is similar in all respect to that described in the first embodiment of FIG. 2 wherein the upper, lower and both side panels or walls have square shaped openings or perforations 23' therein to diffuse the heat from four circumferentially spaced infrared heaters 20'. As in the first embodiment, the heaters and guide housing are shown diagrammatically, and are supported by suitably bracket means. A second guide housing 22' similar in all respects to the guide housing 22 of the first embodiment is installed inside a tank 35. The tank 35 is provided with a supply of cooling water or other cooling fluid entering via a conduit 36 and exiting from tank 35 via an outlet conduit 37. A vacuum or negative pressure is applied to the interior of the chamber of tank 35. The vacuum is applied by any convenient means as via conduit 38. Suitable means are provided to maintain a seal at the entranceway and exit as the extrudate 13 passes through the tank. The operation of the apparatus of such second embodiment is similar in all respects to the previously described embodiment except that tank 35 surrounds the guide housing 22' where the extrudate is cooled by the water flowing through such tank 35 while the extrudate is supported by the open mesh guide housing 22'.

Various modifications are contemplated and may obviously be resorted to by those skilled in the art without departing from the described invention, as hereinafter defined by the appended claims, as only preferred embodiments thereof has been disclosed.

We claim:

1. An apparatus for annealing hollow plastic articles comprising a housing having an inner wall surface for supporting and guiding continuously therethrough a contoured plastic article, said housing having an inlet opening at one end and an outlet opening at the other end for guiding the plastic article thereinto and therefrom, said housing having a plurality of perforations throughout the length thereof, and a plurality of heater means spaced peripherally around the length of said housing for heating a portion of the contoured article passing through said housing.

2. An apparatus for annealing plastic articles as set forth in claim 1 wherein said heaters are infrared heaters spaced evenly along the periphery of said housing.

3. An apparatus for annealing plastic articles as set forth in claim 2 wherein said perforations comprise over fifty percent of the surface area of said housing.

4. An apparatus for annealing plastic articles as set forth in claim 2 wherein said housing has a forwardly disposed portion and a rearwardly disposed portion, said rearwardly disposed portion is at least twice the linear length of said forward portion, and said infrared heaters extend for the full linear length of said first portion.

5. An apparatus for annealing plastic articles as set forth in claim 4 wherein cooling means are connected to said rearwardly disposed portion for cooling the plastic article passing therethrough.

6. An apparatus for annealing plastic articles as set forth in claim 4 wherein said rearwardly disposed portion is enclosed in a cooling tank, cooling means are operatively connected to said tank for circulating coolant therethrough, and a vacuum is connected to the upper portion of said tank to provide a decreased pressure zone therein.

7. An apparatus for annealing a plastic article comprising a longitudinally extending housing; said housing having an upper, lower and two sided planar walls; said walls operative to support and guide an article therethrough each of said walls being perforated to expose the outer surface of an article being guided therethrough; said housing having an inlet opening at one end and an outlet opening at the other end thereof; said housing having a forwardly disposed first portion and a rearwardly disposed second portion; and heater means mounted around said first portion to heat a plastic article guided by said planar walls through said first portion of said housing to heat said plastic to a temperature above the glass transition point thereof.

8. An apparatus for annealing a plastic article as set forth in claim 7 wherein said heater means comprises an infrared heater mounted opposite each one of said walls for the full length of said first portion of said housing.

9. An apparatus for annealing a plastic article as set forth in claim 8 wherein a cooling tank encompases said second portion of said housing, and cooling means operatively connected to said tank for circulating cooling fluid therethrough.

* * * * *